Feb. 21, 1933.    G. A. GILLEN    1,898,122
STEERING WHEEL LOCK
Filed Dec. 9, 1924    2 Sheets-Sheet 1
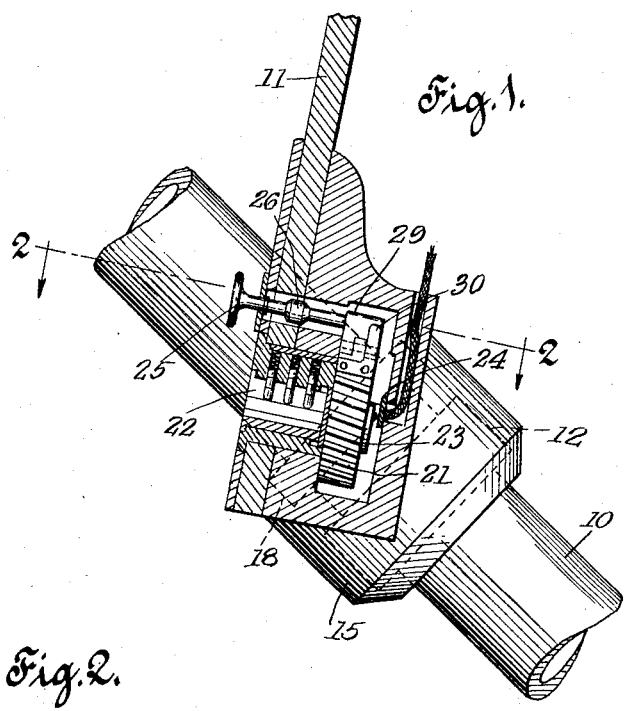
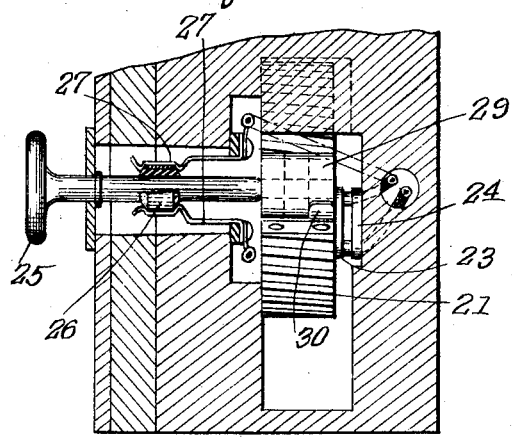
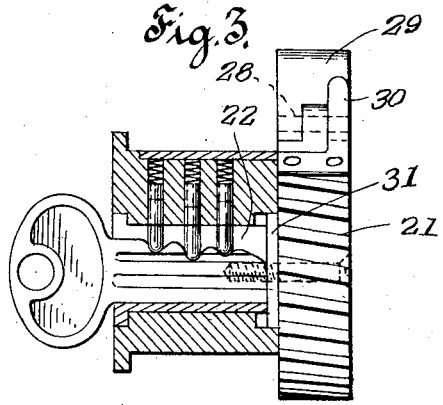
INVENTOR
George A. Gillen Patented Feb. 21, 1933

1,898,122

UNITED STATES PATENT OFFICE

GEORGE A. GILLEN, OF JERSEY CITY, NEW JERSEY, ASSIGNOR, BY MESNE ASSIGNMENTS, TO OAKES PRODUCTS CORPORATION, OF NORTH CHICAGO, ILLINOIS, A CORPORATION OF MICHIGAN

STEERING WHEEL LOCK

Application filed December 9, 1924. Serial No. 754,724.

This invention relates to improvements in steering wheel locks and more particularly to such locks as illustrated in my co-pending application filed June 17th 1924, Serial Number 720,504.

The principal object of the invention is to provide a lock for steering wheels, so designed that when the wheel is locked, the motor will be rendered inoperative, and thus provide for the retaining of two vital elements of a motor vehicle inoperative.

Another object of the invention resides in the provision of a practically pick proof lock which owing to the arrangement of the rotating elements makes it practically imposible to turn the lock cylinder with any instrument other than the proper key.

As a further object, the invention contemplates the provision of a lock wherein the key combinations may be varied by changing the thickness of the key limiting plate.

A still further object of the invention is to provide for the stopping of the motor without necessarily placing the lock in theft-resisting position, and yet prevent the motor from being run when the lock is in theft-resisting position.

With the above and other objects in view which will become more apparent as the description proceeds, the invention consists in the novel construction, combination and arrangement of parts which will be fully set forth in the following specification, claimed, and illustrated in the accompanying drawings in which:—

Figure 1 is a fragmentary side view of a steering post showing this improved lock applied thereto, a portion of which together with a fragment of the instrument board is shown in section.

Figure 2 is a sectional view taken on line 2—2 of Figure 1.

Figure 3 is a side view of the barrel actuated pinion, showing the lock barrel in section.

Figure 4:
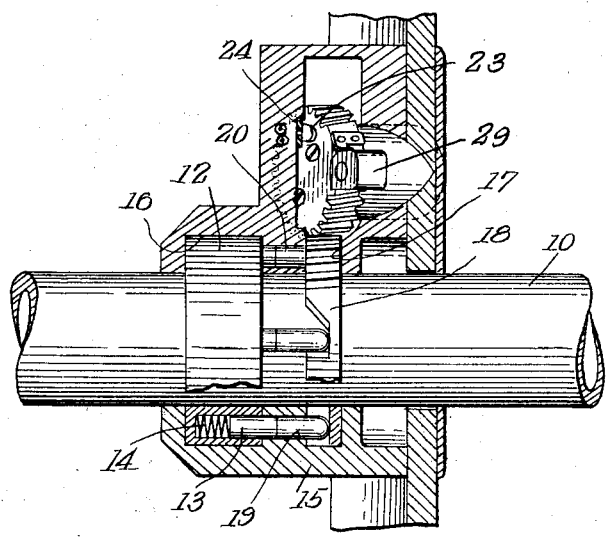
Figure 4 is a horizontal sectional view through the lock.
Figure 5:
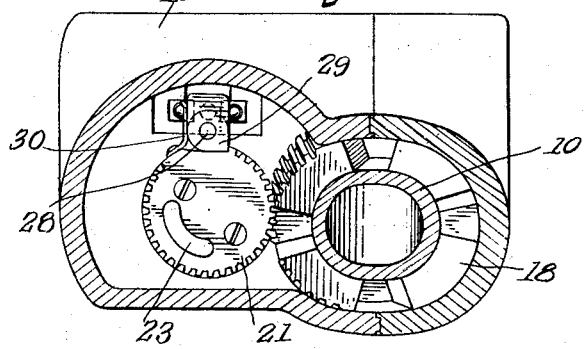
Figure 5 is a sectional view through the lock illustrating the angular relation of the cam ring, with the actuating pinion.

Referring to the drawings in detail, the numeral 10 designates the steering post of a motor vehicle, while the numeral 11 designates the instrument board thereof.

Secured to the steering post 10 is a collar 12 provided in one end wall with a plurality of spaced bores for the reception of locking bolts 13 which tend to move outwardly under the urge of compression coil springs 14 seated on the inner ends of the bores.

Secured to the instrument board 11 is a housing 15 which is provided with chambers 16 and 17 for the reception of the collar 12 and a cam ring 18 respectively. These chambers communicate with each other, through bores 19 in which the actuating pins 20 are housed and it will be seen, that when the depressed portions of said cam ring align with the bores 19, the locking bolts will be projected under the influence of the springs 14 into the bores 19, thus locking the steering post 10 against rotation.

In order that the cam ring may be rotated to project the actuating pins 20 and thereby depress the locking bolts 13 so as to free the steering post, the cam ring is provided with external spiral teeth which mesh with the teeth of an actuating pinion 21 which is secured to the inner end of the cylinder 22 of a standard pin tumbler lock. It will thus be seen that upon rotating the cylinder, the pinion will be turned so as to throw the cam ring into locking or unlocking position.

To provide for the shorting, interrupting or disabling of the ignition circuit of the motor, the pinion is provided with an arcuate contact plate 23 which wipes on grounding contacts 24 within the lock housing which are in turn connected with the ignition circuit of the vehicle. It will thus be seen that upon moving the pinion to locked position, the motor will be simultaneously and automatically rendered inert.

This lock has been designed to take the place of the ordinary type of ignition switch and therefore, it has been found desirable to provide an auxiliary ignition cut-out which may be used when it is desired to cut off the motor without locking the car, such as when coasting.

Figure 6:
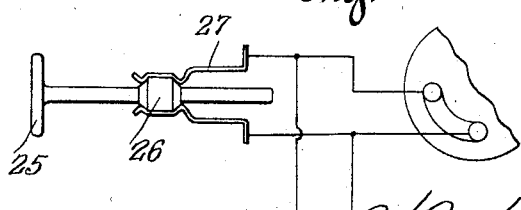
Figure 6 is a wiring diagram of the device, showing the same in locked position.

In order to provide for such a condition, a push button 25 is provided, which carries a contact band 26 which, when the button is in the projected position shown in Figure 6 engages the contact springs 27 which shunts the circuit between the contacts 24, and stops the motor. Upon pressing the button inwardly, the band 26 disengages the springs and disconnects the shunt connection, thus restoring the ignition circuit.

In order to prevent unauthorized operation of the button 25, the pinion 23 has pivoted thereto at 28 a pawl 29 which forms a radial projection on the pinion 21 and is yieldably held in such position by means of a light spring 30. When the pinion is rotated to move the cam ring, to locked position, the pawl will be directly in the path of the push button to prevent its inward movement. The pivotal mounting of the pawl permits the lock to be operated with the push button depressed, without damaging the parts.

In the lock cylinder 22, the number of key combinations may be varied by varying the thickness of the stop plate 31 or by providing an angular face thereon which may be changed to different degrees for engagement with the key. Obviously such an arrangement will multiply the number of key changes and at the same time render the production of a master key practically impossible.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:—

1. A lock for motor vehicles comprising a collar rigidly secured to the steering post of a vehicle, a housing inclosing said collar, locking bolts carried by the collar and normally urged into recesses in the housing to lock the post against turning, means to release said bolts, an ignition circuit controlling means associated with the bolt releasing means for rendering the ignition circuit of the vehicle inoperative when the post is locked, an auxiliary means for rendering the ignition circuit inoperative without locking the steering post, and means actuated upon moving the bolts to locked position for rendering the auxiliary means immovable.

2. A lock for motor vehicles comprising a collar rigidly secured to the steering post of a motor vehicle, a housing inclosing said collar, locking bolts carried by the collar and normally urged into recesses in the housing to lock the post against turning, means to release said bolts, an ignition circuit controlling means associated with the bolt releasing means for rendering the ignition circuit inoperative simultaneously with the locking of the steering post, auxiliary circuit controlling means for rendering the circuit inoperative without locking the steering post, and means actuated upon moving the bolts to locked position for rendering the auxiliary named means immovable, the last named means being so mounted as to avoid injury to the parts should the lock be actuated with the auxiliary means to set to render the circuit operative.

3. A lock for locking a vital part of a motor vehicle and for simultaneously disabling the ignition circuit thereof, means for disabling the ignition circuit independently of actuating the lock, and means actuated by movement of the lock to locked position to prevent movement of the independent means.

4. A lock for locking a vital part of a motor vehicle and for simultaneously disabling the ignition circuit thereof, auxiliary means associated with the lock for disabling the ignition circuit, means actuated by the lock for rendering the auxiliary means inoperative when the lock is in locked position and means to prevent injury to the parts should the lock be locked while the auxiliary means is in operative position.

5. In apparatus of the character disclosed, the combination of coincidental lock mechanism for simultaneously locking the steering mechanism and the ignition of a motor vehicle, an independent control for the ignition freely operable in the unlocked condition of the lock mechanism, means operable in the locked condition of the lock mechanism to prevent such operation of the independent ignition control and means operative to prevent injury to the parts should the lock mechanism be returned to locked position while said independent control is in its position for rendering the ignition operative.

6. In combination, coincidental lock mechanism for simultaneously locking the steering mechanism and rendering the ignition of a motor vehicle inoperative and including key actuated means for operating the same both ways, a manual control operable when the lock is in the unlocked condition to govern the ignition independently of said key actuation and means providing mechanical interconnection between the manual control and lock mechanism to enable locking of both the steering and ignition solely by the key irrespective of the position in which the manual ignition control is left.

7. In combination, a coincidental lock for simultaneously locking the steering apparatus and rendering the ignition circuit of a motor vehicle inoperative, said lock being operable in the reverse direction to simultaneously unlock the steering apparatus and restore the ignition circuit to operative condition, a secondary control for the ignition circuit independently operable to control the ignition when the lock is unlocked, means to secure said independent control against operation when the lock is locked and means enabling return of the lock to the locked position irrespective of the position of said independent control.

Signed at New York, in the County of New York and State of New York, this 25th day of November, 1924.

GEORGE A. GILLEN.